United States Patent
Gao et al.

(10) Patent No.: US 9,836,527 B2
(45) Date of Patent: Dec. 5, 2017

(54) CUSTOMIZED QUERY-ACTION MAPPINGS FOR AN OFFLINE GRAMMAR MODEL

(71) Applicant: Google Inc., Mountain View, CA (US)

(72) Inventors: Yuli Gao, Sunnyvale, CA (US); Sangsoo Sung, Palo Alto, CA (US); Pedro Jose Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/051,778

(22) Filed: Feb. 24, 2016

(65) Prior Publication Data

US 2017/0242914 A1   Aug. 24, 2017

(51) Int. Cl.
G06F 17/27 (2006.01)
G06F 17/30 (2006.01)
(Continued)

(52) U.S. Cl.
CPC ...... *G06F 17/30654* (2013.01); *G06F 17/271* (2013.01); *G06F 17/30684* (2013.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 7,197,331 B2  3/2007 Anastasakos et al.
7,606,708 B2  10/2009 Hwang
(Continued)

FOREIGN PATENT DOCUMENTS

WO    0120500     3/2001
WO    2016191313  12/2016

OTHER PUBLICATIONS

The Intellectual Property Office of the United Kingdom; Combined Search Report under Section 17 and Examination Report under Section 18(3) of Application No. GB1621095.7 dated May 11, 2017.

(Continued)

*Primary Examiner* — Lamont Spooner
(74) *Attorney, Agent, or Firm* — Middleton Reutlinger

(57) ABSTRACT

An offline semantic processor of a resource-constrained voice-enabled device such as a mobile device utilizes an offline grammar model with reduced resource requirements to parse voice-based queries. In various implementations, a query issued at a resource-constrained device may be semantically processed to identify candidate responsive actions that are performable by the resource-constrained device. Candidate responsive action performance statistics may be analyzed to select, from the one or more candidate responsive actions, a qualifying responsive action. In various implementations, the candidate responsive action performance statistics may relate to performance of the one or more candidate responsive actions by the resource-constrained device following issuance of the query. An offline grammar model stored in the resource-constrained device may be updated to include a mapping between the issued query and the qualifying responsive action, wherein the offline grammar model maps queries to actions that are performable by the resource-constrained device while offline.

12 Claims, 4 Drawing Sheets

(51) Int. Cl.
*G10L 15/26* (2006.01)
*G10L 15/22* (2006.01)

(52) U.S. Cl.
CPC ...... *G10L 15/265* (2013.01); *G10L 2015/223* (2013.01); *G10L 2015/225* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................. 704/1, 9, 10, 251, 257
See application file for complete search history.

(56) References Cited

U.S. PATENT DOCUMENTS

| | | | |
|---|---|---|---|
| 7,689,420 B2 | 3/2010 | Paek et al. | |
| 7,729,913 B1 | 6/2010 | Lee et al. | |
| 8,195,468 B2 | 6/2012 | Weider et al. | |
| 8,364,709 B1* | 1/2013 | Das | G06F 17/3097 707/780 |
| 8,392,543 B1* | 3/2013 | Singh | G06F 17/30578 709/221 |
| 8,447,607 B2 | 5/2013 | Weider et al. | |
| 8,868,587 B1* | 10/2014 | Subramaniam | G06F 17/30657 707/759 |
| 8,949,130 B2 | 2/2015 | Phillips | |
| 9,218,366 B1* | 12/2015 | Li | G06F 17/30247 |
| 9,424,354 B2* | 8/2016 | Teevan | G06F 17/30864 |
| 9,594,837 B2* | 3/2017 | Raman | G06F 17/30864 |
| 2002/0042707 A1 | 4/2002 | Zhao et al. | |
| 2002/0169600 A1 | 11/2002 | Busayapongchai et al. | |
| 2003/0191802 A1* | 10/2003 | Zhao | G06F 17/30902 709/203 |
| 2004/0224674 A1* | 11/2004 | O'Farrell | G06F 17/30575 455/418 |
| 2005/0043953 A1 | 2/2005 | Winterkamp et al. | |
| 2005/0049874 A1 | 3/2005 | Coffman et al. | |
| 2007/0005579 A1* | 1/2007 | Grewal | G06F 17/30578 |
| 2007/0124263 A1 | 5/2007 | Katariya et al. | |
| 2007/0214131 A1* | 9/2007 | Cucerzan | G06F 17/30864 |
| 2007/0239454 A1 | 10/2007 | Paek et al. | |
| 2008/0270135 A1 | 10/2008 | Goel et al. | |
| 2009/0254512 A1* | 10/2009 | Broder | G06Q 30/02 |
| 2009/0327224 A1* | 12/2009 | White | G06F 17/30864 |
| 2010/0169407 A1* | 7/2010 | Hsueh | G06F 9/52 709/203 |
| 2010/0179956 A1* | 7/2010 | Jammalamadaka | G06F 17/30389 707/748 |
| 2011/0044435 A1 | 2/2011 | Bachran et al. | |
| 2011/0252343 A1* | 10/2011 | Broman | G06F 17/30864 715/760 |
| 2012/0036123 A1* | 2/2012 | Hasan | G06F 17/30386 707/723 |
| 2012/0072419 A1* | 3/2012 | Moganti | G06F 17/30038 707/737 |
| 2012/0253799 A1 | 10/2012 | Bangalore et al. | |
| 2013/0013607 A1* | 1/2013 | Mooney | G06F 17/30017 707/737 |
| 2013/0086024 A1* | 4/2013 | Liu | G06F 17/30864 707/706 |
| 2013/0332162 A1 | 12/2013 | Keen | |
| 2013/0346545 A1* | 12/2013 | Petersen | H04L 67/10 709/217 |
| 2014/0122447 A1* | 5/2014 | Hunter | G06F 17/30097 707/692 |
| 2014/0337007 A1* | 11/2014 | Waibel | G06F 17/289 704/3 |
| 2015/0019541 A1* | 1/2015 | Carus | G06F 17/3053 707/723 |
| 2015/0032443 A1* | 1/2015 | Karov | G06F 17/2785 704/9 |
| 2015/0254310 A1* | 9/2015 | Imaizumi | G06F 17/30554 707/723 |
| 2016/0055203 A1* | 2/2016 | Shi | G06F 17/30424 707/769 |
| 2016/0063094 A1* | 3/2016 | Udupa | G06F 17/277 707/748 |
| 2016/0132692 A1* | 5/2016 | Kerschbaum | G06F 17/30477 713/189 |
| 2016/0147944 A1* | 5/2016 | Douglass | G06F 19/322 705/51 |
| 2016/0239940 A1* | 8/2016 | Imai | G06T 1/60 |
| 2016/0253402 A1* | 9/2016 | Klots | G06F 17/30584 |
| 2016/0350320 A1* | 12/2016 | Sung | G06F 17/3097 |
| 2017/0039483 A1* | 2/2017 | Cheng | G06F 17/30477 |
| 2017/0193020 A1* | 7/2017 | Yi | G06F 17/30321 |

OTHER PUBLICATIONS

De Mori R et al: "Spoken language understanding", IEEE Signal Processing Magazine, IEEE Service Center, Piscataway, NJ, US, vol. 25, No. 3, May 1, 2008, pp. 50-28.
International Search Report and Written Opinion of PCT Ser. No. PCT/US16/66619 dated Mar. 24, 2017.

\* cited by examiner

CUSTOMIZED QUERY-ACTION MAPPINGS FOR AN OFFLINE GRAMMAR MODEL

BACKGROUND

Voice-based user interfaces are increasingly being used in the control of computers and other electronic devices. One particularly useful application of a voice-based user interface is with portable electronic devices such as mobile phones, watches, tablet computers, head-mounted devices, virtual or augmented reality devices, etc. Another useful application is with vehicular electronic systems such as automotive systems that incorporate navigation and audio capabilities. Still another useful application is with appliances and other devices not traditionally associated with computers, such as lighting, appliances, heating and plumbing, security systems, and so on associated with the category of "Internet of Things" (IoT). Such applications are generally characterized by non-traditional form factors that limit the utility of more traditional keyboard or touch screen inputs and/or usage in situations where it is desirable to encourage a user to remain focused on other tasks, such as when the user is driving or walking.

Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces incorporate both an initial speech-to-text conversion that converts an audio recording of a human voice to text, and a semantic analysis that analysis the text in an attempt to determine the meaning of a user's request. Based upon a determined meaning of a user's recorded voice, an action may be undertaken such as performing a search or otherwise controlling a computer or other electronic device.

The computing resource requirements of a voice-based user interface, e.g., in terms of processor and/or memory resources, can be substantial, and as a result, some conventional voice-based user interface approaches employ a client-server architecture where voice input is received and recorded by a relatively low-power client device, the recording is transmitted over a network such as the Internet to an online service for speech-to-text conversion and semantic processing, and an appropriate response is generated by the online service and transmitted back to the client device. Online services can devote substantial computing resources to processing voice input, enabling more complex speech recognition and semantic analysis functionality to be implemented than could otherwise be implemented locally within a client device. However, a client-server approach necessarily requires that a client be online (i.e., in communication with the online service) when processing voice input. Particularly in mobile and automotive applications, continuous online connectivity may not be guaranteed at all times and in all locations, so a client-server voice-based user interface may be disabled in a client device whenever that device is "offline" and thus unconnected to an online service.

SUMMARY

This specification is directed generally to various implementations that facilitate offline semantic processing in a resource-constrained voice-enabled device. An offline semantic processor of such a device utilizes an offline grammar model with reduced resource requirements to parse voice-based queries received by the device. In some implementations, the offline grammar model may be updated to include mappings between so-called "long tail" voice-based queries and responsive actions that are performable by a resource-constrained device using the offline grammar model. In this manner, users can add customized query-action mappings to offline grammars used by offline semantic processors associated with the users' personal computing devices.

Therefore, in some implementations, a method may include: semantically processing a query issued at a resource-constrained device to identify one or more candidate responsive actions that are performable by the resource-constrained device; analyzing candidate responsive action performance statistics to select, from the one or more candidate responsive actions, a qualifying responsive action, wherein the candidate responsive action performance statistics relate to performance of the one or more candidate responsive actions by the resource-constrained device following issuance of the query; and updating an offline grammar model stored in the resource-constrained device to include a mapping between the issued query and the qualifying responsive action, wherein the offline grammar model maps queries to actions that are performable by the resource-constrained device while offline. The capabilities, performance, and efficiency of the resource-constrained device may thereby be improved.

In some implementations, the method may further include providing, as output to a user operating the resource-constrained device, one or more prompts suggesting performance of the respective one or more candidate actions. In some implementations, the analyzing may include analyzing statistics pertaining to response by the user to the one or more prompts. In some implementations, the one or more prompts may include a selectable graphical element. In some implementations, the one or more prompts may include an audible or tactile prompt.

In some implementations, the method may further include communicating the offline grammar model to the resource-constrained device for storage by the resource-constrained device and for use by a semantic processor of the resource-constrained device while offline. In some implementations, communicating the offline grammar model to the resource-constrained device dynamically updates the offline grammar model stored in the resource-constrained device.

In some implementations, the issued query may be a voice-based query, and the offline grammar model maps voice-based queries to actions. In some implementations, the method may further include collecting data indicative of performance of the one or more candidate actions by a plurality of resource-constrained devices associated with a user that operates the resource-constrained device. In some implementations, analyzing the statistics may be based on the collected data.

In some implementations, the semantic processing may be performed using an online grammar model, wherein the offline grammar model has reduced resource requirements relative to the online grammar model. In some implementations, the method may further include restricting access to the one or more of the mapping, the issued query, and the offline grammar to the resource-constrained device.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In the implementations discussed hereinafter, an offline semantic processor of a resource-constrained voice-enabled device utilizes an offline grammar model with reduced resource requirements to parse voice-based queries received by the device. In some implementations, the offline grammar model may be updated to include mappings between so-called "long tail" voice-based queries and responsive actions that are performable by a resource-constrained device using the offline grammar model. As used herein, a "long tail query" is a query that is unique or occurs relatively infrequently in a search volume of queries. In some instances, a long tail query may be literally long (e.g., include a relatively large number of tokens), but this is not required. As an example, the voice-based query "play <artist name>" may be used by many users of a large population to initiate playback of the particular artist, and thus would not be considered a long tail query. By contrast, suppose one particular user tries to initiate playback of an artist using a phrase such as "I'm really in the mood for some <artist name>." The latter query would likely qualify as a long tail query (unless in the future a large number of users began using it in the same manner).

Further details regarding selected implementations are discussed hereinafter. It will be appreciated however that other implementations are contemplated so the implementations disclosed herein are not exclusive.

Example Hardware and Software Environment

Figure 1:
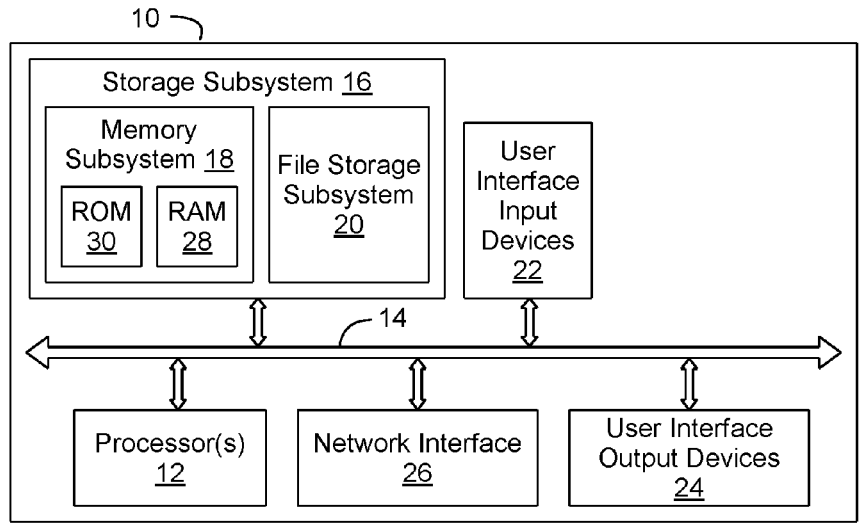
FIG. 1 illustrates an example architecture of a computer system.

Now turning to the drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Distributed Voice Input Processing Environment

Figure 2:
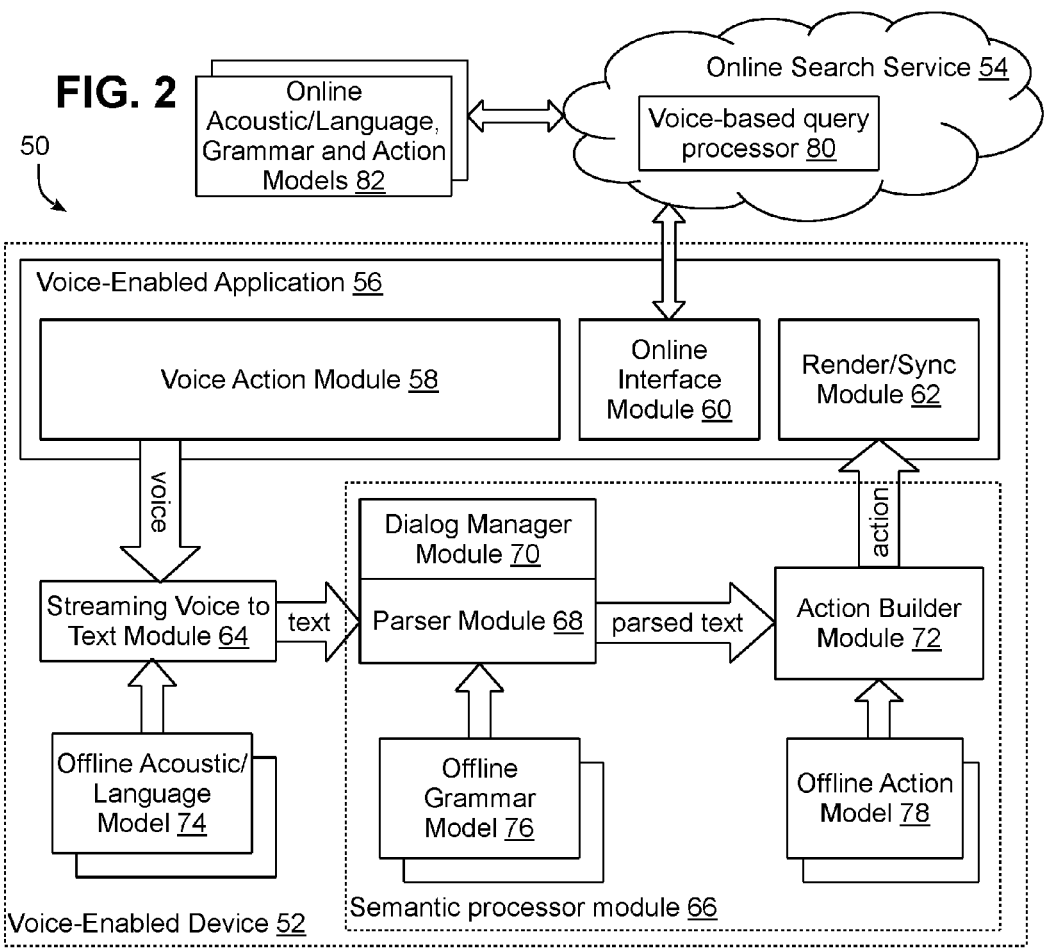
FIG. 2 is a block diagram of an example distributed voice input processing environment.

FIG. 2 illustrates an example distributed voice input processing environment 50, e.g., for use with a voice-enabled device 52 in communication with an online service such as online search service 54. In the implementations discussed hereinafter, for example, voice-enabled device 52 is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks. Some such devices may also be considered to be offline devices to the extent that such devices may be capable of operating "offline" and unconnected to an online service at least a portion of time, e.g., based upon an expectation that such devices may experience temporary network connectivity outages from time to time under ordinary usage.

Online search service 54 in some implementations may be implemented as a cloud-based service employing a cloud infrastructure, e.g., using a server farm or cluster of high performance computers running software suitable for handling high volumes of requests from multiple users. In the illustrated implementation, online search service 54 is capable of querying one or more databases to locate requested information, e.g., to provide a list of web sites including requested information. Online search service 54 may not be limited to voice-based searches, and may also be capable of handling other types of searches, e.g., text-based searches, image-based searches, etc. In other implementations, an online system need not necessarily handle searching, and may be limited to handling voice-based requests for non-search actions such as setting alarms or reminders, managing lists, initiating communications with other users via phone, text, email, etc., or performing other actions that may be initiated via voice input. For the purposes of this disclosure, voice-based requests and other forms of voice input may be collectively referred to as voice-based queries, regardless of whether the voice-based queries seek to initiate a search, pose a question, issue a command, etc. In general, therefore, any voice input, e.g., including one or more words or phrases, may be considered to be a voice-based query within the context of the illustrated implementations.

In the implementation of FIG. 2, voice input received by voice-enabled device 52 is processed by a voice-enabled application (or "app") 56, which in some implementations may be a search application. In other implementations, voice input may be handled within an operating system or firmware of a voice-enabled device. Application 56 in the illustrated implementation includes a voice action module 58, online interface module 60 and render/synchronization module 62. Voice action module 58 receives voice input directed to the application and coordinates the analysis of the voice input and performance of one or more actions for a user of the voice-enabled device 52. Online interface module 60 provides an interface with online search service 54, including forwarding voice input to service 54 and receiving responses thereto. Render/synchronization module 62 manages the rendering of a response to a user, e.g., via a visual display, spoken audio, or other feedback interface suitable for a particular voice-enabled device. In addition, in some implementations, module 62 also handles synchronization with online search service 54, e.g., whenever a response or action affects data maintained for the user in the online search service (e.g., where voice input requests creation of an appointment that is maintained in a cloud-based calendar).

Application 56 relies on various middleware, framework, operating system and/or firmware modules to handle voice input, including, for example, a streaming voice to text module 64 and a semantic processor module 66 including a parser module 68, dialog manager module 70 and action builder module 72.

Module 64 receives an audio recording of voice input, e.g., in the form of digital audio data, and converts the digital audio data into one or more text words or phrases (also referred to herein as "tokens"). In the illustrated implementation, module 64 is also a streaming module, such that voice input is converted to text on a token-by-token basis and in real time or near-real time, such that tokens may be output from module 64 effectively concurrently with a user's speech, and thus prior to a user enunciating a complete spoken request. Module 64 may rely on one or more locally-stored offline acoustic and/or language models 74, which together model a relationship between an audio signal and phonetic units in a language, along with word sequences in the language. In some implementations, a single model 74 may be used, while in other implementations, multiple models may be supported, e.g., to support multiple languages, multiple speakers, etc.

Whereas module 64 converts speech to text, module 66 attempts to discern the semantics or meaning of the text output by module 64 for the purpose or formulating an appropriate response. Parser module 68, for example, relies on one or more offline grammar models 76 to map text to particular actions and to identify attributes that constrain the performance of such actions, e.g., input variables to such actions. In some implementations, a single model 76 may be used, while in other implementations, multiple models may be supported, e.g., to support different actions or action domains (i.e., collections of related actions such as communication-related actions, search-related actions, audio/visual-related actions, calendar-related actions, device control-related actions, etc.)

As an example, an offline grammar model 76 may support an action such as "set a reminder" having a reminder type parameter that specifies what type of reminder to set, an item parameter that specifies one or more items associated with the reminder, and a time parameter that specifies a time to activate the reminder and remind the user. Parser module 64 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm,", such that at 5:00 pm that day the user receives a reminder to "buy bread."

Parser module 68 may also work in conjunction with a dialog manager module 70 that manages a dialog with a user. A dialog, within this context, refers to a set of voice inputs and responses similar to a conversation between two individuals. Module 70 therefore maintains a "state" of a dialog to enable information obtained from a user in a prior voice input to be used when handling subsequent voice inputs. Thus, for example, if a user were to say "remind me to pick up bread," a response could be generated to say "ok, when would you like to be reminded?" so that a subsequent voice input of "after work" would be tied back to the original request to create the reminder.

Action builder module 72 receives the parsed text from parser module 68, representing a voice input interpretation and generates an action along with any associated parameters for processing by module 62 of voice-enabled application 56. Action builder module 72 may rely on one or more offline action models 78 that incorporate various rules for creating actions from parsed text. In some implementations, for example, actions may be defined as functions F such that $F(I_T)=A_U$, where T represents the type of the input interpretation and U represents the type of output action. F may therefore include a plurality of input pairs (T, U) that are mapped to one another, e.g., as $f(i_t)=a_u$, where $i_t$ is an input proto variable of type t, and $a_u$ is an output modular argument or parameter of type u. It will be appreciated that some parameters may be directly received as voice input, while some parameters may be determined in other manners, e.g., based upon a user's location, demographic information, or based upon other information particular to a user. For example, if a user were to say "remind me to pick up bread at the grocery store," a location parameter may not be determinable without additional information such as the user's current location, the user's known route between work and home, the user's regular grocery store, etc.

It will be appreciated that in some implementations models 74, 76 and 78 may be combined into fewer models or split into additional models, as may be functionality of modules 64, 68, 70 and 72. Moreover, models 74-78 are referred to herein as offline models insofar as the models are stored locally on voice-enabled device 52 and are thus accessible offline, when device 52 is not in communication with online search service 54.

Furthermore, online search service 54 generally includes complementary functionality for handling voice input, e.g., using a voice-based query processor 80 that relies on various acoustic/language, grammar and/or action models 82. It will be appreciated that in some implementations, particularly when voice-enabled device 52 is a resource-constrained device, voice-based query processor 80 and models 82 used thereby may implement more complex and computational resource-intensive voice processing functionality than is local to voice-enabled device 52. In other implementations, however, no complementary online functionality may be used.

In some implementations, both online and offline functionality may be supported, e.g., such that online functionality is used whenever a device is in communication with an online service, while offline functionality is used when no connectivity exists. In other implementations different actions or action domains may be allocated to online and offline functionality, and while in still other implementations, online functionality may be used only when offline functionality fails to adequately handle a particular voice input.

Figure 3:
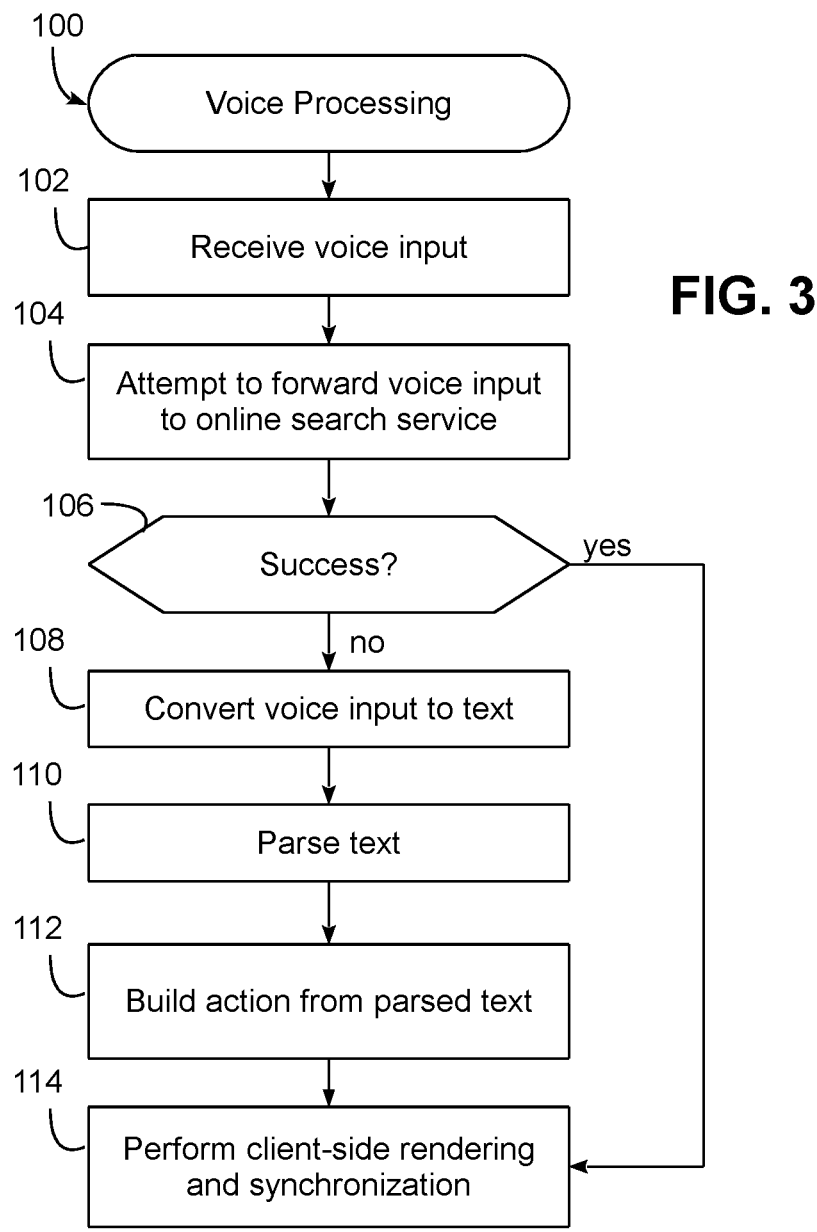
FIG. 3 is a flowchart illustrating an example method of processing a voice input using the environment of FIG. 2.

FIG. 3, for example, illustrates a voice processing routine 100 that may be executed by voice-enabled device 52 to handle a voice input. Routine 100 begins in block 102 by receiving voice input, e.g., in the form of a digital audio signal. In this implementation, an initial attempt is made to forward the voice input to the online search service (block 104). If unsuccessful, e.g., due to the lack of connectivity or the lack of a response from the online search service, block 106 passes control to block 108 to convert the voice input to text tokens (block 108, e.g., using module 64 of FIG. 2), parse the text tokens (block 110, e.g., using module 68 of FIG. 2), and build an action from the parsed text (block 112, e.g., using module 72 of FIG. 2). The resulting action is then used to perform client-side rendering and synchronization (block 114, e.g., using module 62 of FIG. 2), and processing of the voice input is complete.

Returning to block 106, if the attempt to forward the voice input to the online search service is successful, block 106 bypasses blocks 108-112 and passes control directly to block 114 to perform client-side rendering and synchronization. Processing of the voice input is then complete. It will be appreciated that in other implementations, as noted above, offline processing may be attempted prior to online processing, e.g., to avoid unnecessary data communications when a voice input can be handled locally.

Dynamically Updatable Offline Grammar Model for Resource-Constrained Offline Device As noted above, in some implementations, a voice-enabled device may be resource-constrained, and may lack the raw computing power and/or storage capabilities of an online service. Much of the complexity in connection with implementing a voice-based user interface is embodied in the models used by the various modules that implement such functionality, including, for example, the grammar models that map text to actions.

A grammar model, in this regard, may refer to any data structure suitable for mapping one or more text words or phrases (collectively referred to herein as "tokens") to one or more actions to be implemented by a device. The text words or phrases mapped to a particular action may also be considered to constitute distinct voice-based queries mapped to the action. A grammar model may be implemented, for example, as a transition state graph, or in other suitable data structures. Moreover, a grammar model may be generated in a number of manners, e.g., via programming, via training, etc.

An action may refer to practically any operation that may be performed by a particular device, such as performing a search, placing a call, sending a text message, sending an email, setting a reminder, getting directions, setting an appointment, changing a device setting, creating a note, playing a song or video, changing volume, etc. In some implementations, actions may be grouped into collections referred to as action domains, e.g., a communication action domain (for placing calls, sending messages, etc.), a media action domain (for playing songs, playing videos, etc.), a planning action domain (for creating reminders, creating appointments, etc.), and a navigation action domain (for displaying maps, obtaining directions, etc.), among others. It will be appreciated that grammar models may vary for different languages, for different speakers, as well as for different end user applications.

The utility of a grammar model is based at least in part on the number of different mappings created for different actions. Language is constantly evolving, and different speakers may speak different instructions to perform the same actions, e.g., based on differences in age, country, region, etc. The number of mappings embodied within a grammar model, however, generally increases both the amount of memory required to store the model, and the amount of processing time and resources required to identify a particular mapping in the model.

Figure 4:
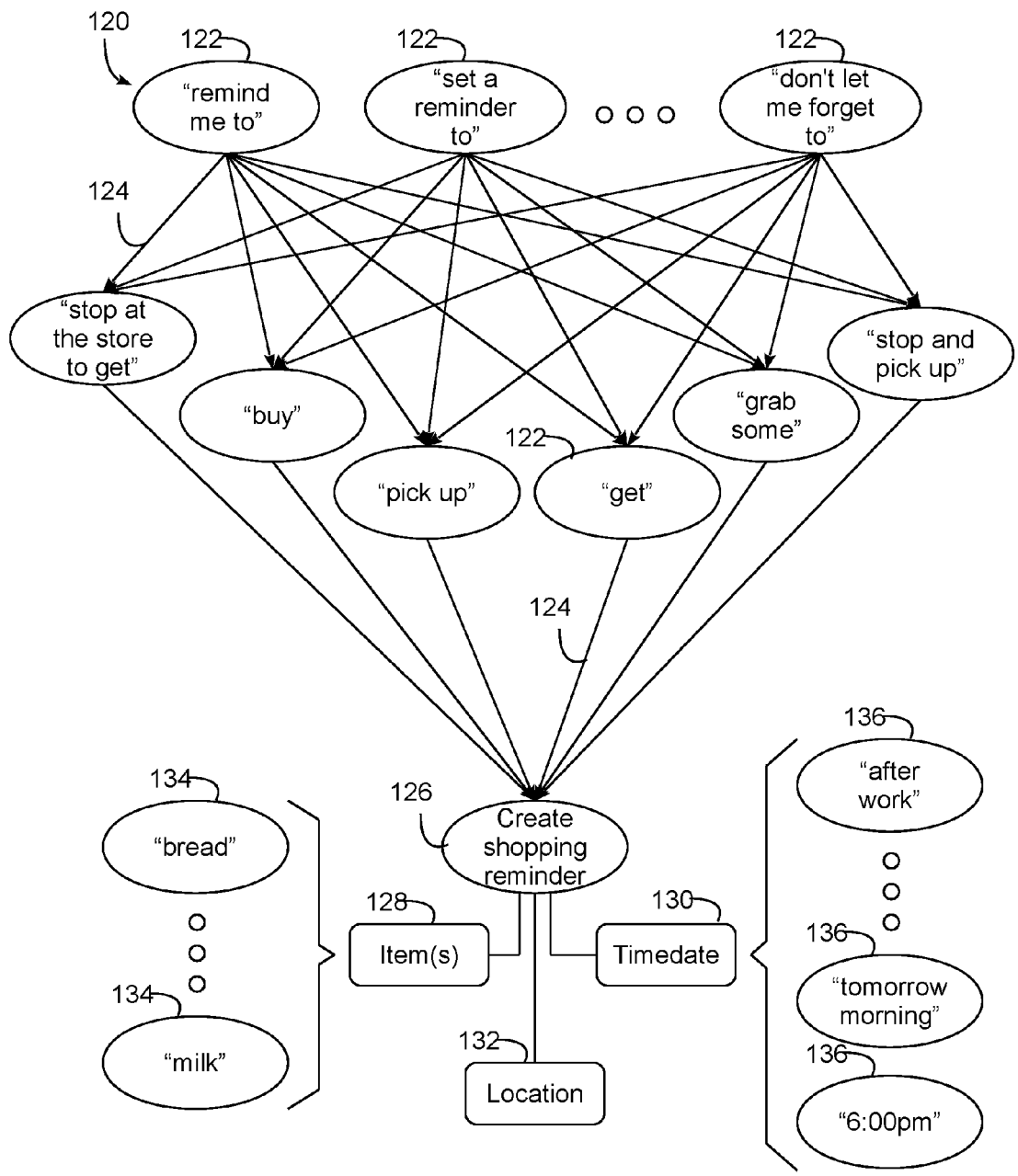
FIG. 4 illustrates an example grammar model for use in processing voice inputs in an action domain.

Given the extensive computing resources available in many online services, many such services employ large and complex grammar models capable of handling a wide variety of mappings. FIG. 4, for example, illustrates a portion of an example grammar model 120 implemented as a finite state transition graph incorporating a plurality of states 122 and transitions 124 mapped to a "create shopping reminder" action 126 having item, timedate, and location parameters 128, 130 and 132. As seen in the figure, multiple tokens are supported both for triggering a reminder (e.g., "remind me to," "set a reminder to," "don't let me forget to," etc.) and for specifying that the reminder is a shopping reminder (e.g., "stop at the store to get," "buy," "pick up," "get", "grab some," "stop and pick up," etc.), resulting in large number of potential mappings and thus synonymous phrases or voice-based queries that could be used to create a shopping reminder.

Moreover, for each parameter 128, 130, 132, a large number of potential values may be mapped within the grammar model. For the list of items 128, for example, countless product names and descriptions 134 may be possible (e.g., "bread," "milk," etc.), including both the generic terms for items as well as particular brand names. For the timedate parameter 130, various phrases 136 associated with times and/or dates may be supported, including both numerical values (e.g., "6:00 pm") and non-numerical values (e.g., "after work," "tomorrow morning," etc.). For the location parameter 132, addresses (e.g., "101 main street"), generic locations (e.g., "grocery store,"), business names (e.g., a particular grocery store), etc. may be specified. In some implementations, one or more parameters may be optional. In addition, in some implementations, one or more parameters may be defined based upon non-voice data, e.g., current GPS location, a user's favorite businesses, knowledge of a user's typical working hours, etc., and in some instances based upon a combination of voice and non-voice data (e.g., where a user states "grocery store" and this input, in combination with the user's known route home, is used to identify a particular grocery store along the route). Furthermore, parameters may be derived in some implementations based upon dialogs or conversations, such that the parameters are surmised at least in part from prior voice input.

Graph 120 represents only a small subset of the potential mappings that may be included in a grammar model, and it will be appreciated that in order to cover all possible variations of voice-based queries that might be received from a user, mappings for all of those possible variations would need to be incorporated into a grammar model. Online services, lacking many of the resource constraints of individual computers and electronic devices, have the luxury of incorporating large numbers of mappings to maximize the usefulness of a grammar model. As a consequence, however, the grammar models used by online services (which are referred to herein as "online" grammar models) are generally too large and/or too processor-intensive to be used in individual computers and electronic devices, particularly many of the types of devices having the greatest need for voice-based user interfaces.

In the implementations discussed herein, however, an offline grammar model may be generated to be smaller and/or less process-intensive for use in a resource-constrained voice-enabled offline device, thereby accommodating the memory and/or processing limitations of the device. Moreover, the offline grammar model may be generated based upon voice-based queries issued at one or more specific resource-constrained devices by one or more specific users, in addition to or instead of voice-based queries frequently issued across a plurality of resource-constrained devices by a large number of users. As a result, the offline grammar model desirably includes voice-based queries that are customized to a small number of particular resource-constrained devices and/or to a limited number of users of such resource-constrained device(s), such that an offline semantic processor will desirably be responsive to voice-based queries that are likely to be used at the particular resource-constrained device(s), while having reduced resource requirements as compared to an online grammar model.

In various implementations, an offline grammar model may be constructed based upon statistical analysis of action performance at resource constrained devices following issuance of voice-based queries. For example, in some implementations, a query issued at a resource-constrained device may be semantically processed to identify one or more candidate responsive actions that are performable by the resource-constrained device. So-called "candidate responsive action performance statistics" may be analyzed to select, from the one or more candidate responsive actions, a qualifying responsive action. The candidate responsive action performance statistics may relate to performance of the one or more candidate responsive actions by the resource-constrained device following issuance of the query. An offline grammar model stored in the resource-constrained device—which may map queries to actions that are performable by the resource-constrained device—may then be updated to include a mapping between the issued query and the qualifying responsive action. As a result, not all of the queries supported by the online grammar model are incorporated into the offline grammar model, but the memory footprint of the offline grammar model and the processing requirements necessary for utilizing the offline grammar model are reduced to better account for the resource constraints of an offline device.

Figure 5:
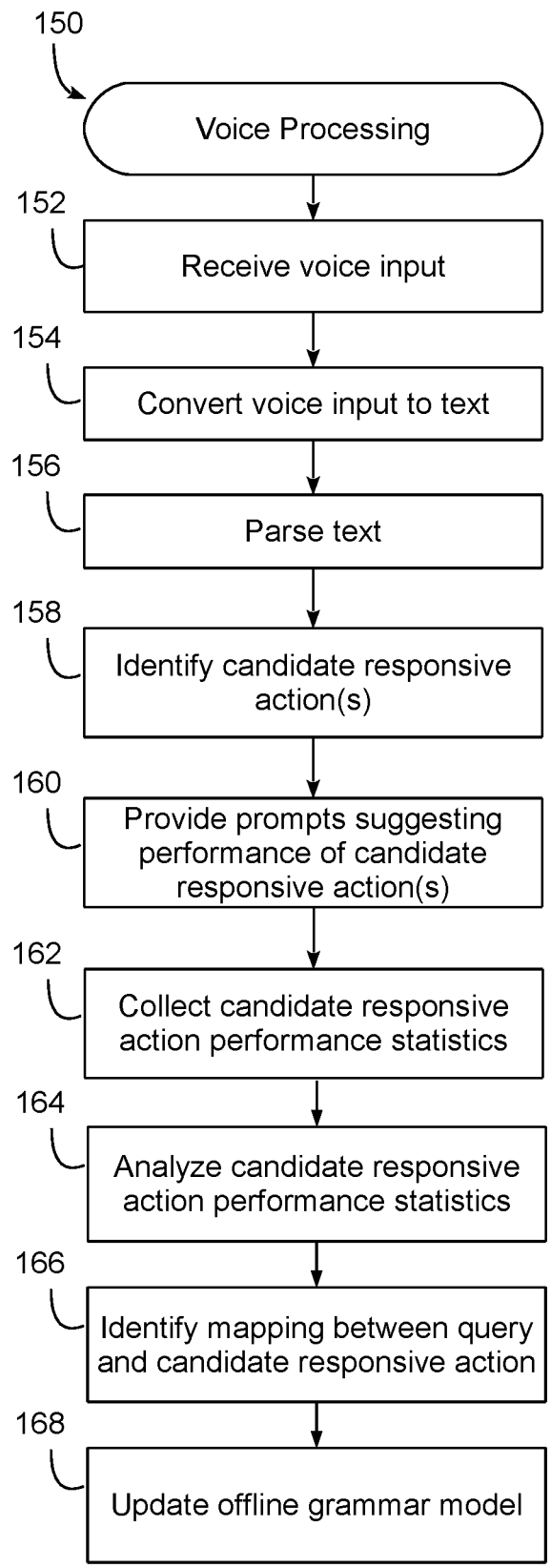
FIG. 5 is a flowchart illustrating an example method of building and/or updating an offline grammar model.

FIG. 5, for example, illustrates a routine 150 suitable for execution by an online or offline service to build an offline grammar model based at least in part on analysis of candidate responsive action performance statistics. Routine 150 may be executed by the same service that processes voice-based queries, or may be a different service altogether. Moreover, routine 150 may be used to initially generate an offline grammar model, or to generate an updated offline grammar model that is used to replace a previously-generated offline grammar model.

Blocks 152-156 of routine 150 are similar to various blocks of routine 100 depicted in FIG. 3. At block 152, voice input is received, e.g., in the form of a digital audio signal. At block 154, the voice input is converted to text tokens (e.g., using module 64 and/or 82 of FIG. 2). At block 110, the text tokens may be parsed (e.g., using module 68 and/or 82 of FIG. 2).

At block 158, one or more candidate actions that are potentially responsive to the issued query may be identified, e.g., by modules 64, 68, and 72 of the resource constrained device 52, or if online, by module 82. In some implementations, the identification of candidate responsive actions performed at block 158 may be performed in a manner similar to the operations of block 112. Suppose a user issues a particular long-tail query such as "boy, I sure could go for some Crazy Hair." A semantic processor (e.g., 66 or 82 in FIG. 2) may determine, using various techniques such as entity identification from a knowledge graph, etc., that "Crazy Hair" refers to a musical artist. Based on that determination, it may be further determined that a next logical action (i.e., a candidate responsive action) of device 52 would be to open up a music player and play music recorded by The Crazy Hair Band.

In various implementations, there may be multiple potentially responsive candidate actions identified. For example, there may be multiple options for playing music by a particular artist. A streaming application may stream music from a streaming "channel" associated with the artist (and/or with music associated with similar musical tastes) to the resource-constrained device over one or more networks. Another music player application may play music stored locally on the resource-constrained device. In such a scenario, opening either application to play The Crazy Hair Band would constitute a candidate action that is potentially responsive to the query, "boy, I sure could go for some Crazy Hair."

Many users may operate multiple resource-constrained devices, e.g., as part of a coordinated "ecosystem," at which the user may issue long tail voice-based queries. For example, a user may operate both a mobile phone and a smart watch. In some cases, the smart watch may connect to the mobile phone using a low power and/or short range wireless technology, such as Bluetooth, Wi-Fi, etc., but this is not required. If the user issues a long tail voice-based query at one of the devices (e.g., speaks into a microphone of the smart watch), the user may desire that a responsive action be performed at that same device or at the other device. Accordingly, in various implementations, one or more candidate responsive actions that are performable at one or both devices may be identified at block 158.

In some embodiments, and as indicated at block 160, one or more prompts corresponding to the one or more candidate responsive actions identified at block 158 may be provided to a user at the resource-constrained device 52. Each prompt may suggest performance of a corresponding candidate responsive action at the resource-constrained device 52. Prompts may come in various forms, such as audio, visual, and/or tactile (e.g., vibration) feedback. For instance, and continuing the scenario described above, the user may be presented with two selectable graphical elements, one to initiate a streaming player to play a Bruce Springsteen channel, and another to initiate playback of locally-stored Bruce Springsteen content.

Prompts may be presented (e.g., output) on a resource-constrained device in various forms and fashions. For example, in some implementations, prompts may be presented at part of another application's graphical user interface. The application may be, for instance, a web browser, a social media application, an intelligent personal assistant application, and so forth. The prompt may be presented visually as a pop-up, a hyperlink (textual or graphical in appearance), and/or as a so-called "card" that the user can select, ignore, and/or reject. Additionally or alternatively, the prompt may be presented audibly. For example, in response to a voice-based query to which there may be multiple candidate responsive actions, a resource-constrained device may audibly output something like "Did you mean perform action x or perform action y"?

Additionally, and as noted above, some users may operate multiple devices as part of a single coordinated ecosystem. In some such implementations, one or more prompts may be provided at one or more of the multiple devices. Suppose a user issues a voice-based query "find directions to location X" at her smart watch. While the smart watch may have a display, if the user is driving or riding a bike, it may be undesirable for the user to respond to a visual prompt presented on the display. However, the user's mobile phone may have a speaker, or may be paired with another audio device such as a car stereo or Bluetooth headphones worn by the user. Such a speaker may be suitable for providing an audible prompt to the user. In such case, in response to the user issuing the voice-based query on her smart watch, the user's phone may cause an audible prompt to be provided to the user, e.g., "did you mean location X in city A or city B?"

At block 162, candidate responsive action performance statistics may be collected from one or more resource-constrained devices operated by a user. In various implementations, candidate responsive action performance statistics may relate to and/or be indicative of performance of the one or more candidate responsive actions identified at block 158. In various implementations, a resource-constrained device may collected these statistics itself, e.g., by observing and recording user behavior at various time intervals after issuance of a voice-based query. In some implementations, the resource-constrained device may observe and record various data pertaining to user response (or lack thereof) to prompts provided at block 160, such as how quickly the user responded to the prompt, whether the user dismissed the prompt and caused the resource-constrained device to perform an alternative action, etc.

At block 164, candidate responsive action performance statistics collected at block 162 may be analyzed. If no prompts were provided at block 160, then one or more observed user interactions with one or more resource-constrained devices after issuance of the query may constitute indirect (e.g., circumstantial) evidence of correlation between the issued query and one or more potentially responsive actions. But suppose a relatively long period of time passes between issuance of the voice-based query and initiation of any candidate responsive actions. That may be less probative of such a correlation, especially if in the interim, the user operates one or more resource-constrained devices to perform one or more actions not identified at block 158 as candidate responsive actions.

Suppose the user issues a particular long-tail query such as "boy, I sure could go for some Springsteen." As noted above, modules 64, 68, and 72 of the resource constrained device 52, or if online, module 82, may identify one or more candidate responsive actions that involve playback of music by Bruce Springsteen. For example, one candidate responsive action may be to open a streaming app to stream a Bruce Springsteen channel; another may be to open a music player app to playback locally-stored Bruce Springsteen songs. If statistics collected at block 162 indicate that after issuance of the voice-based query, the user immediately opened the streaming music player application to stream the Bruce Springsteen channel, then at block 164, it may be determined that there is a stronger correlation between the issued user query and the streaming app than there is between the issued query and the music player for playing locally-stored music.

Additionally or alternatively, suppose one or more prompts were provided at block 160. The user's response to the one or more prompts, whether in the form of selecting a graphical icon or in the form of providing a voice response to an audible prompt, may be analyzed. Because the prompts are provided in response to an issued query, affirmative user response to a prompt may provide more direct evidence of a correlation between the issued query and the action initiated by the prompt. In addition to whether the user responded to a prompt, there also may be evaluation of how quickly the user responded to the prompt, how many alternative prompts there were to respond to, etc.

Based on the analysis at block 164, at block 166, one or mappings between an issued query and one or more candidate responsive actions may be identified. In some implementations, the resource constrained device 52 may transmit the identified one or more mappings back to module 82 (or another online component). In situations in which the mappings contain or allude to confidential information (a secret password to operate a garage door, for instance), the mappings may be anonymized prior to transmission. Additionally or alternatively, a user may configure device 52 to retain the mappings at device 52 as private mappings, and not to provide the mappings to module 82.

At block 168, one or more offline grammar models (e.g., 76 in FIG. 2) employed by one or more resource-constrained devices operated by a user may be updated (e.g., at device 52 and/or module 82) to include the one or more mappings identified at block 166. For example, an offline grammar may be packaged at module 82 and distributed to one or more resource-constrained voice-enabled offline devices (e.g., multiple devices operated by a particular user that uses a distinctive long tail voice based query). The one or more offline resource-constrained devices may in turn receive and unpack the packaged offline grammar model and store the model on the respective devices. Packaging may be used to compress the offline grammar model to reduce transmission size and to otherwise format the model in a manner that is usable by the respective devices. Accordingly, the resource-constrained device may thereafter utilize the offline grammar, when offline or even when online, to process voice-based queries.

In addition to or instead of routine 150 being used to build an initial offline grammar model, routine 150 also may be used to update an offline grammar model, e.g., to better track changes in usage over time, to incorporate additional long tail voice-based queries for specific users, etc. Such updates may be considered to be dynamic updates in that a resource-constrained device may be updated either as a part of a system update, an application update or as a background update that is otherwise hidden from a user.

In some implementations, mappings between long tail queries and responsive actions may be incorporated into an online grammar model in addition to one or more offline grammar models. That way, if a new user issues a long tail query that was previously identified and mapped to a different user, the same mapping may be added to one or more offline grammars used by one or more resource-constrained devices operated by the new user. However, in some implementations, users may opt out of such collaboration to maintain the privacy, anonymity, and/or security of their potentially-sensitive long tail queries.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
    semantically processing, by an online semantic processor, a long tail voice-based query issued at a first resource-constrained device of a coordinated ecosystem of resource-constrained devices controlled by a user to identify one or more candidate responsive actions that are performable by one or more of the resource-constrained devices, wherein the long tail voice-based query is unique or occurs relatively infrequently in a search volume of queries;
    providing, as output at one or more of the resource-constrained devices, one or more prompts suggesting performance of the respective one or more candidate actions;
    analyzing one or more responses by the user to the one or more prompts to select, from the one or more candidate responsive actions, a qualifying responsive action; and
    updating an offline grammar model stored in each of the coordinated ecosystem of resource-constrained devices to include a mapping between the issued long tail voice-based query and the qualifying responsive action, wherein the offline grammar model maps voice-based queries to actions that are performable by each resource-constrained device of the coordinated ecosystem of resource-constrained devices while offline.

2. The method of claim 1, wherein the one or more prompts comprise a selectable graphical element.

3. The method of claim 1, wherein the one or more prompts comprise an audible or tactile prompt.

4. The method of claim 1, further comprising communicating the offline grammar model to each resource-constrained device of the coordinated ecosystem of resource-constrained devices for storage and for use by respective semantic processors of each resource-constrained device of the coordinated ecosystem of resource-constrained devices while offline.

5. The method of claim 4, wherein the communicating dynamically updates the offline grammar model stored in the resource-constrained device.

6. The method of claim 1, wherein the semantic processing is performed using an online grammar model, wherein the offline grammar model has reduced resource requirements relative to the online grammar model.

7. The method of claim 1, further comprising restricting access to the one or more of the mapping, the issued query, and the offline grammar to the resource-constrained device.

8. A system including memory and one or more processors operable to execute instructions stored in the memory, comprising instructions to:
semantically process a long tail voice-based query issued at a first resource-constrained device of a coordinated ecosystem of resource-constrained devices controlled by a user to identify one or more candidate responsive actions that are performable by one or more of the resource-constrained devices, wherein the long tail voice-based query is unique or occurs relatively infrequently in a search volume of queries;
provide, as output at one or more of the resource-constrained devices, one or more prompts suggesting performance of the respective one or more candidate actions;
analyze one or more responses by the user to the one or more prompts to select, from the one or more candidate responsive actions, a qualifying responsive action; and
update an offline grammar model stored in each of the coordinated ecosystem of resource-constrained devices to include a mapping between the issued long tail voice-based query and the qualifying responsive action, wherein the offline grammar model maps voice-based queries to actions that are performable by each resource-constrained device of the coordinated ecosystem of resource-constrained devices while offline.

9. The system of claim 8, wherein the one or more prompts comprise a selectable graphical element.

10. The system of claim 8, wherein the one or more prompts comprise an audible or tactile prompt.

11. The system of claim 8, further comprising instructions to communicate the offline grammar model to each resource-constrained device of the coordinated ecosystem of resource-constrained devices for storage and for use by respective semantic processors of each resource-constrained device of the coordinated ecosystem of resource-constrained devices while offline.

12. At least one non-transitory computer-readable medium comprising instructions that, in response to execution of the instructions by a computer system, cause the computer system to perform the following operations:
semantically processing, by an online semantic processor, a long tail voice-based query issued at a first resource-constrained device of a coordinated ecosystem of resource-constrained devices controlled by a user to identify one or more candidate responsive actions that are performable by one or more of the resource-constrained devices, wherein the long tail voice-based query is unique or occurs relatively infrequently in a search volume of queries;
providing, as output at one or more of the resource-constrained devices, one or more prompts suggesting performance of the respective one or more candidate actions;
analyzing one or more responses by the user to the one or more prompts to select, from the one or more candidate responsive actions, a qualifying responsive action; and
updating an offline grammar model stored in each of the coordinated ecosystem of resource-constrained devices to include a mapping between the issued long tail voice-based query and the qualifying responsive action, wherein the offline grammar model maps voice-based queries to actions that are performable by each resource-constrained device of the coordinated ecosystem of resource-constrained devices while offline.

* * * * *